(12) United States Patent
Norman et al.

(10) Patent No.: US 7,310,478 B1
(45) Date of Patent: Dec. 18, 2007

(54) COMMUNICATION SYSTEM WITH HYBRID PROTECTION AT MULTIPLE OSI LAYERS

(75) Inventors: Charles William Norman, Lenexa, KS (US); Mark Loyd Jones, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 693 days.

(21) Appl. No.: 10/924,570

(22) Filed: Aug. 24, 2004

(51) Int. Cl.
*H04J 14/00* (2006.01)
(52) U.S. Cl. .............................................. 398/5; 398/3
(58) Field of Classification Search .................. 398/3, 398/5
See application file for complete search history.

(56) References Cited

U.S. PATENT DOCUMENTS 7,209,439 B2 * 4/2007 Rawlins et al. ............. 370/230
2002/0181479 A1 * 12/2002 Okuno ....................... 370/404

* cited by examiner

*Primary Examiner*—Leslie Pascal

(57) ABSTRACT

A communication system couples communication devices using optical switches and links. The optical switches provide OSI Layer 1 restoration in response to a fault. The communication devices provide OSI layer 2/3 restoration in response to the fault after OSI Layer 1 protection is complete.

20 Claims, 2 Drawing Sheets

FIG. 1 — PRIOR ART

COMMUNICATION SYSTEM WITH HYBRID PROTECTION AT MULTIPLE OSI LAYERS

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to communication systems that use hybrid protection schemes at multiple OSI layers.

2. Description of the Prior Art

FIG. 1 illustrates communication system 100 in an example of the prior art. Communication system 100 includes nodes 105-106 and paths 107-108. Node 105 includes routers 101-102 that form a first mated pair. Node 106 includes routers 103-104 that form a second mated pair. Path 107 includes links 111-112. Path 108 includes links 113-114. Link 111 couples router 101 to router 103. Link 112 couples router 102 to router 104. Link 113 couples router 101 to router 103. Link 114 couples router 102 to router 104.

Paths 107-108 are geographically diverse to provide path diversity if one of the paths fails. In this example, path 107 is geographically shorter than path 108—possibly by thousands of miles. In some cases, nodes 105 and 106 are on a communication ring where short path 107 represents a short segment of the ring between nodes 105-106, and long path 108 represents the longer segment around the other side of the ring.

In a normal operating mode, links 111-114 are each loaded to 40% of capacity. Thus, half of the traffic between nodes 105-106 traverses long path 108 in the normal operating mode. If router 101 fails, then mated router 102 takes over for router 101, so that router failure is handled at layer 2/3 of the Open Systems Interconnection (OSI) stack (where layer 2/3 means layer 2, layer 3, or a combination of layers 2 and 3). In this failure mode, the load of links 111 and 113 drops to zero since these links are coupled to failed router 101, and correspondingly, the load of links 112 and 114 rises from 40% to 80%, because these links now carry the added load from unused links 111 and 113. Note that half of the traffic still takes the long path 108.

If link 111 fails, then router 101 transfers the traffic over link 113, so that link failure is also handled at OSI layer 2/3. In this failure mode, the load of failed link 111 drops to zero, and correspondingly, the load of link 113 rises from 40% to 80% since link 113 now carries the added load of failed link 111.

Router 101 has a carrier delay timer that starts after a loss of signal is detected, such as OSI layer 1 detection. The carrier delay timer must time out before the above-described OSI layer 2/3 restoration is implemented. The carrier delay timer prevents layer 2/3 restoration from occurring in response to a mere signal glitch where a quality signal quickly returns. The timer is set relatively low, such as 20 milliseconds.

The expense of links 111-114 can be measured by a fixed cost per mile, and thus, long links are more expensive than short links. Links 113-114 follow long path 108, which can be hundreds or thousands of miles longer than short path 107. Thus, links 113-114 are much more expensive to implement than shorter links 111-112.

In addition to the increased cost, the use of longer links 113-114 adds latency to communications between nodes 105-106. In the above example where router 101 shifts traffic from failed link 111 to link 113, the extra distance of longer link 113 adds latency to communications between nodes 105-106. In additional to the latency added by increased distance, long path 108 typically has more nodes (not shown) in between nodes 105-106 than does short path 107. The higher number of intermediate nodes adds additional latency to communications between nodes 105-106. Many customer applications cannot tolerate the latency of long path 108. The customer may have a Service Level Agreement (SLA) that specifies acceptable latencies.

Thus, current network designs carry large amounts of traffic over long paths—even under normal operating conditions—which forces the network to implement expensive high-capacity links over the longer path. This heavy use of the longer path also adds latency, which forces some customers to use a different communication network.

SUMMARY OF THE INVENTION

Examples of the invention include communication systems and their methods of operation. In some examples of the invention, the communication system comprises: a first communication device and a second communication device, a first optical switch and a second optical switch, a first link and a second link coupling the first communication device to the first optical switch, a third link and a fourth link coupling the second communication device to the second optical switch, and a fifth link, a sixth link, and a seventh link coupling the first optical switch to the second optical switch. Under normal operation, the first optical switch connects the first link to the fifth link and connects the second link to the sixth link and the second optical switch connects the third link to the fifth link and connects the fourth link to the sixth link. In response to a fault on the fifth link and the sixth link, the first optical switch is configured to automatically disconnect the first link from the fifth link and connect the first link to the seventh link and the second optical switch is configured to automatically disconnect the third link from the fifth link and connect the third link to the seventh link. After the seventh link is connected to the first link and the third link, the first communication device is configured to automatically re-route traffic from the second link to the first link and the second communication device is configured to automatically re-route traffic from the fourth link to the third link. Wherein the disconnections and the connections provided by the first optical switch and the second optical switch comprise Open Systems Interconnect (OSI) layer 1 restoration and the re-routing provided by the first communication device and the second communication device comprises OSI layer 2/3 restoration.

In some examples of the invention, the first communication device and the second communication device are configured to provide the OSI layer 2/3 restoration in response to a timer time-out after the fault, wherein the timer is set based on a time period that allows the OSI layer 1 restoration to complete.

In some examples of the invention, the time period comprises a detection time period to detect the fault, a switch time period to determine a new route and perform switching to the new route, and a restoration time period for traffic to propagate over the new route.

In some examples of the invention, the timer comprises a carrier delay timer and is set at greater than 100 milliseconds.

In some examples of the invention, the links comprise optical wavelengths.

In some examples of the invention, the first communication device and the second communication device comprise Internet routers.

In some examples of the invention, the first communication device and the second communication device comprise tier one Internet routers.

In some examples of the invention, the communication system further comprises a third communication device and a fourth communication device, wherein the first communication device and the third communication device form a first mated pair of Internet routers, and the second communication device and the fourth communication device form a second mated pair of Internet routers.

In some examples of the invention, the first communication device and the second communication device comprise asynchronous transfer mode systems.

In some examples of the invention, the first communication device and the second communication device comprise multi-protocol label switching systems.

BRIEF DESCRIPTION OF THE DRAWINGS

The same reference number represents the same element on all drawings.

DETAILED DESCRIPTION OF THE PREFERRED EMBODIMENT

Figure 1:
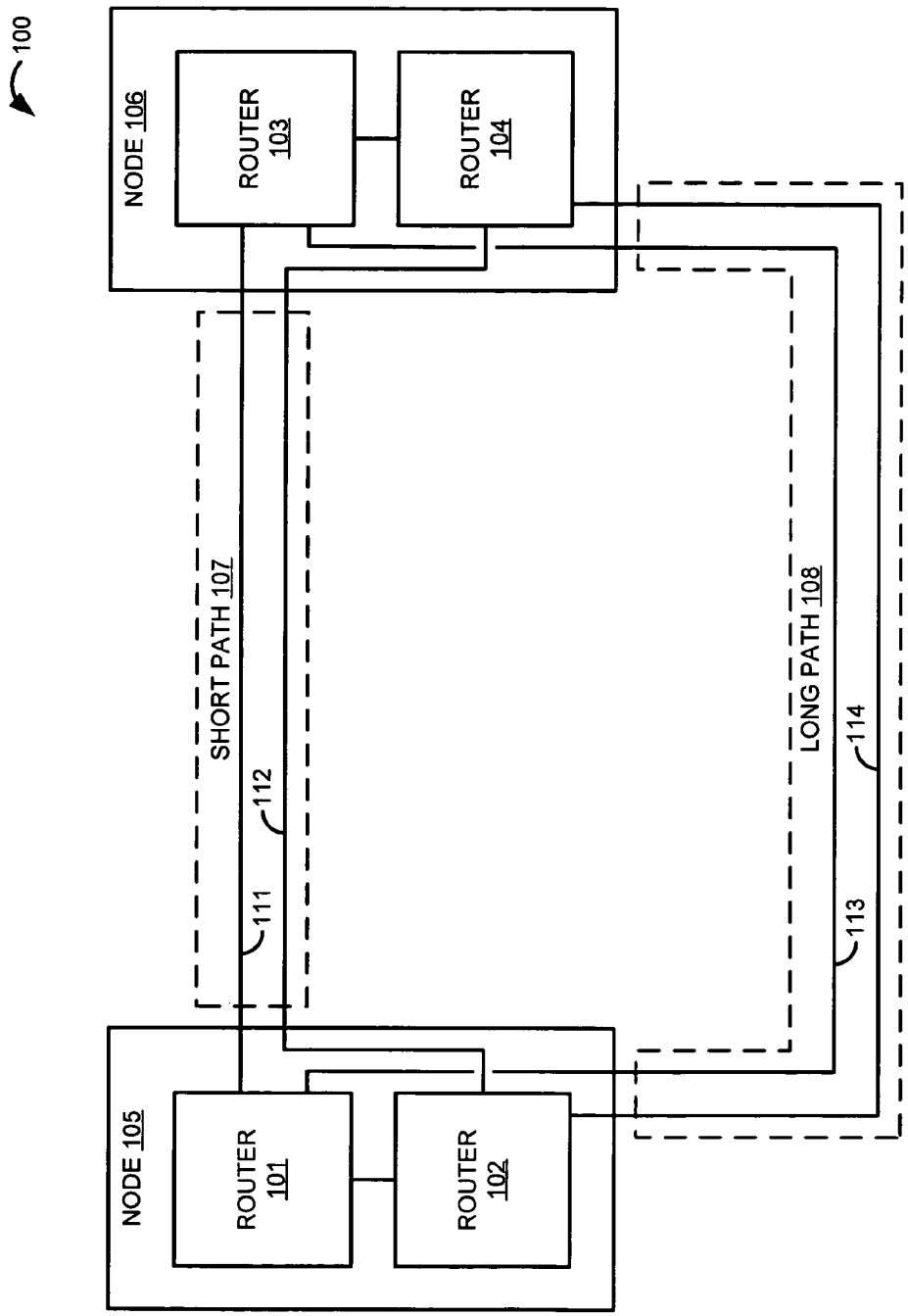
FIG. 1 illustrates a communication system in an example of the prior art.
Figure 2:
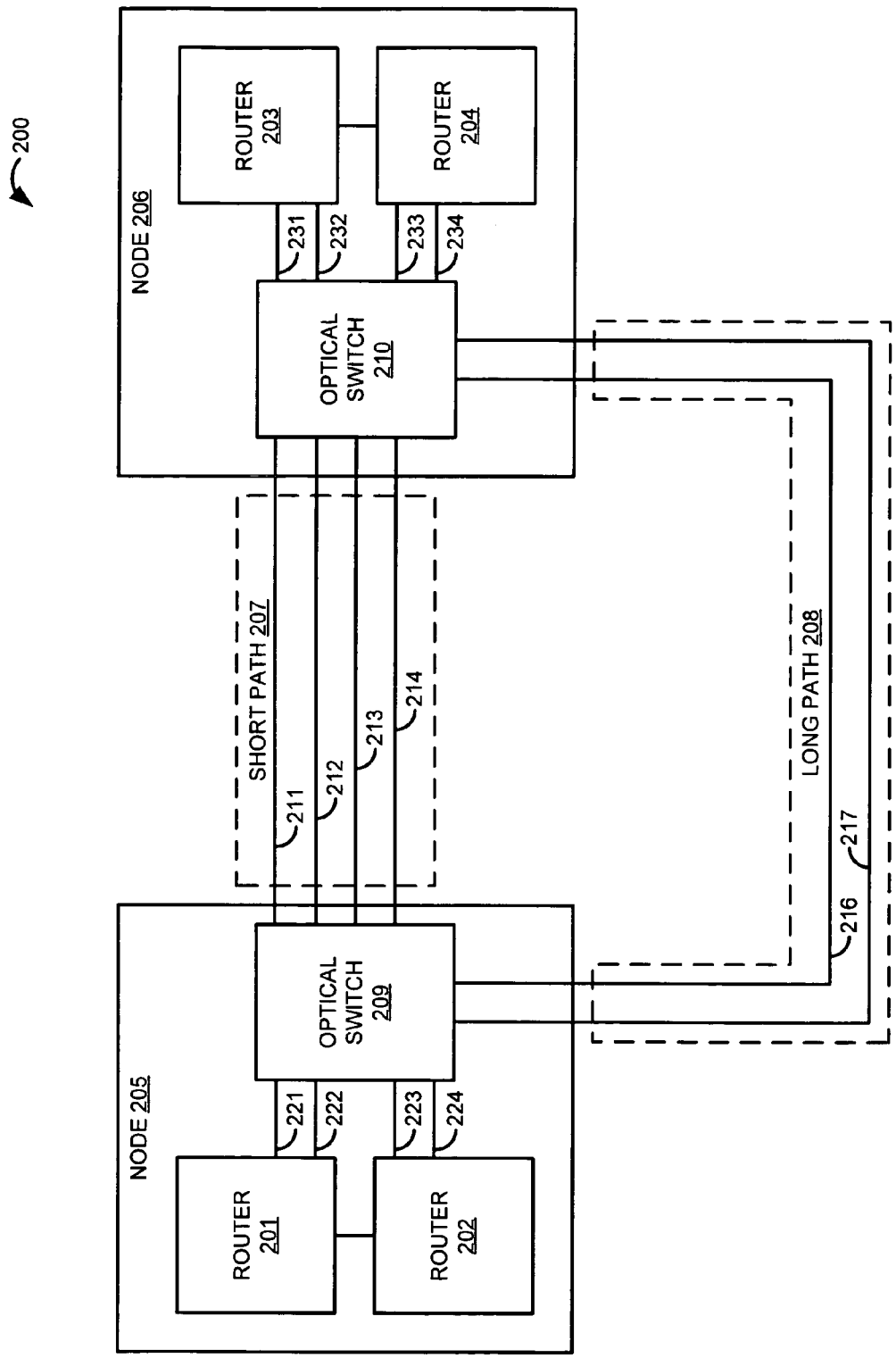
FIG. 2 illustrates a communication system in an example of the invention.

FIG. 2 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below for the various examples can be combined in various ways to form multiple variations of the invention. As a result, the invention is not limited to the specific examples described below, but only by the claims and their equivalents.

FIG. 2 illustrates communication system 200 in an example of the invention. Communication system 200 includes nodes 205-206 and paths 207-208. Node 205 includes routers 201-202 that form a first mated pair. Node 205 also includes optical switch 209. Optical switch 209 is coupled to router 201 by links 221-222. Optical switch 209 is coupled to router 202 by links 223-224. Node 206 includes routers 203-204 that form a second mated pair. Node 206 also includes optical switch 210. Optical switch 210 is coupled to router 203 by links 231-232. Optical switch 210 is coupled to router 204 by links 233-234.

Optical switches 209-210 could be optical switching systems, such as the SN 16000 supplied by Sycamore, the Core Director supplied by Ciena, the HDX supplied by Nortel, or another suitable optical switch. Optical switches 209-210 could be all-optical or could have intermediate electrical stages. Optical switches 209-210 could include external control systems that are not shown for clarity.

Path 207 includes links 211-214. Path 108 includes links 216-217. Links 211-214 and 216-217 couple optical switch 209 to optical switch 210. Paths 207-208 are geographically diverse to provide path diversity if path 207 fails. In this example, path 207 is geographically shorter than path 208—possibly by thousands of miles. In some cases, nodes 205 and 206 are on a communication ring where short path 207 represents a short segment of the ring between nodes 205-206, and long path 208 represents the longer segment around the other side of the ring.

Links 211-214, 216-217, 221-224, and 231-234 could be bi-directional. Links 211-214 could represent different optical fibers, different wavelengths on one or more fibers, or different signals (such as STS-1 signals) on one or more fibers. Links 216-217 could represent different optical fibers, different wavelengths on one or more fibers, or different signals on one or more fibers. Links 221-222 could represent different optical fibers, different wavelengths on one or more fibers, or different signals on one or more fibers. Links 223-224 could represent different optical fibers, different wavelengths on one or more fibers, or different signals on one or more fibers. Links 231-232 could represent different optical fibers, different wavelengths on one or more fibers, or different signals on one or more fibers. Links 233-234 could represent different optical fibers, different wavelengths on one or more fibers, or different signals on one or more fibers.

In a normal operating mode, optical switch 209 connects link 221 to link 211, and connects link 222 to link 212. Optical switch 210 connects link 211 to link 231, and connects link 212 to link 232, so traffic between router 201 and router 203 traverses links 221-211-231 and links 222-212-232. In a normal operating mode, optical switch 209 connects link 223 to link 213, and connects link 224 to link 214. Optical switch 210 connects link 213 to link 233, and connects link 214 to link 234, so traffic between router 202 and router 204 traverses links 223-213-233 and links 224-214-234.

In a normal operating mode, links 211-214 are each loaded to 40% of capacity. Note that all links that carry traffic between nodes 205-206 in a normal operating mode now follow short path 207, instead of using longer links 216-217 in a normal operating mode.

In the prior art communication system, all restoration upon either router or link failure is handled by the routers, and thus, is handled at layer 2/3 of the OSI stack. In communication system 200, routers 201-204 handle restoration upon router failure, but optical switches 209-210 and routers 201-204 handle restoration upon link failure using a hybrid scheme. Thus, link failure is handled at layer 1 and layer 2/3 of the OSI stack.

If router 201 fails, then mated router 202 takes over for router 201, so that router failure is handled at layer 2/3 of the OSI stack. In this failure mode, the load of links 211-212 drops to zero since these links are coupled to failed router 201, and correspondingly, the load of links 213-214 rises from 40% to 80%, because these links now carry the added load from unused links 211 and 213. Optical switches 209-210 retain their current link connections.

Links 211-214 are not 1:1 protected, meaning that there are not four back-up links available for each of the four working links 211-214. There are only two available back-up links 216-217. Thus, there are fewer back-up links than operating links. Note that during normal operation, links 211-214 are loaded to 40% of capacity. If links 211-214 all fail, possibly due to a fiber cut on path 207, then a hybrid restoration scheme is implemented at OSI layer 1 and at OSI layer 2/3.

Layer 1 restoration occurs first. Optical switch 209 disconnects link 221 from failed link 211 and connects link 221 to link 216. Optical switch 209 disconnects link 223 from failed link 213 and connects link 223 to link 217. Links 216-217 might be selected because they are the available back-up links with the lowest cost and/or lowest latency. Likewise, optical switch 210 disconnects link 231 from failed link 211 and connects link 231 to link 216, and optical switch 210 disconnects link 233 from failed link 213 and connects link 233 to link 217. Traffic between routers 201 and 203 now traverses links 221-216-231. Traffic between routers 202 and 204 traverses links 223-217-233.

Thus, OSI layer 1 restoration through optical switches 209-210 is implemented to restore two of the failed links. After the layer 1 restoration is implemented, routers 201-204 implement layer 2/3 restoration to finish the restoration process.

After the layer 1 restoration, links 221-216-231 and links 223-217-233 are operating at 40% capacity, but links 222-212-232 and links 224-214-234 are not operating because of failed links 212 and 214. Router 201 senses the failure on link 222 and re-routes traffic off of link 222 and onto operating link 221. The re-route raises the load on links 221-216-231 from 40% to 80% of capacity. Likewise, router 202 senses the failure on link 224 and re-routes traffic off of link 224 and onto operating link 223. The re-route raises the load on links 223-217-233 from 40% to 80% of capacity. At this point, the communications capacity between routers 201-204 has been restored.

Optical switches 209-210 perform a series of steps to perform restoration at layer 1. First, optical switches 209-210 detect a loss of signal during a detection time period. The detection time period could be less than 10 milliseconds, and may be set by a standard. Second, optical switches 209-210 determine a new route and perform the corresponding switching to the new route during a switch time period. This may entail selecting an available low cost link with acceptable latency. The switch time period could be between 20-500 milliseconds with a typical value of 200 milliseconds. Third, optical switches 209-210 transfer the signal over the new route, and the signal must propagate to the receiving end during a restoration time period. The restoration time period is based on the speed of light in the fiber, the length of the fiber, and processing delays at intermediate nodes. A factor may be used to calculate the restoration time period, such as 8 milliseconds for each 1000 miles of the restoration path.

Routers 201-204 each have a carrier delay timer that times out after a loss of signal before layer 2/3 restoration is implemented. The timer prevents layer 2/3 restoration from occurring in response to a mere signal glitch where a quality signal quickly returns. In prior systems, the timer is set relatively low, such as 10 milliseconds.

For the restoration described above, the carrier delay timer should be set to allow completion of layer 1 restoration, before layer 2/3 restoration is initiated. Thus, if the detection time period is 5 milliseconds, the switch time period is 200 milliseconds, and the restoration time period 15 milliseconds, then the carrier delay timer should be set to at least 220 milliseconds to allow layer 1 restoration to complete before layer 2/3 restoration is attempted. In prior systems, the setting of the carrier delay timer would cause the timer to time out well before layer 1 restoration had completed, and thus, would cause unnecessary and conflicting layer 2/3 restoration to occur in parallel with layer 1 restoration. The carrier delay timer adjustment allows the hybrid restoration at multiple OSI layers to occur in a coordinated manner.

Routers 201-204 could be Tier 1 Internet routers that are connected to the Internet backbone. Alternatively, nodes 205 and 206 could include Asynchronous Transfer Mode (ATM) or Multi-Protocol Label Switching (MPLS) devices instead of, or in addition to, routers 201-204. In addition, the routers and devices within nodes 205-206 may not be configured as mated pairs.

Advantages

Communication system 200 can be implemented to provide the following advantages, although some implementations of communication system 200 may not provide these advantages. Communication system 200 transfers traffic on shorter links during normal operating conditions. This improves latency for the traffic that was transferred over the longer links in prior systems. In addition, a hybrid restoration scheme may be used to provide robust protection at multiple OSI layers that requires fewer back-up links. In prior systems, restoration only at layer 1 required 1:1 protection for each operating link. The use of hybrid restoration at multiple OSI layers allows for less than 1:1 protection. In the above example, the protection ratio was 2:1. Thus, the hybrid restoration requires fewer back-up links than layer 1 restoration alone. Fewer back-up links results in lower cost and complexity for the communication network.

The invention claimed is:

1. A communication system comprising:
   a first communication device and a second communication device, a first optical switch and a second optical switch, a first link and a second link coupling the first communication device to the first optical switch, a third link and a fourth link coupling the second communication device to the second optical switch, and a fifth link, a sixth link, and a seventh link coupling the first optical switch to the second optical switch, wherein under normal operation, the first optical switch connects the first link to the fifth link and connects the second link to the sixth link and the second optical switch connects the third link to the fifth link and connects the fourth link to the sixth link; and
   in response to a fault on the fifth link and the sixth link, the first optical switch is configured to automatically disconnect the first link from the fifth link and connect the first link to the seventh link and the second optical switch is configured to automatically disconnect the third link from the fifth link and connect the third link to the seventh link, and after the seventh link is connected to the first link and the third link, the first communication device is configured to automatically re-route traffic from the second link to the first link and the second communication device is configured to automatically re-route traffic from the fourth link to the third link, wherein the disconnections and the connections provided by the first optical switch and the second optical switch comprise Open Systems Interconnect (OSI) layer 1 restoration and the re-routing provided by the first communication device and the second communication device comprises OSI layer 2/3 restoration.

2. The communication system of claim 1 wherein the first communication device and the second communication device are configured to provide the OSI layer 2/3 restoration in response to a timer time-out after the fault, wherein the timer is set based on a time period that allows the OSI layer 1 restoration to complete.

3. The communication system of claim 2 wherein the time period comprises a detection time period to detect the fault, a switch time period to determine a new route and perform switching to the new route, and a restoration time period for traffic to propagate over the new route.

4. The communication system of claim 2 wherein the timer comprises a carrier delay timer and is set at greater than 100 milliseconds.

5. The communication system of claim 1 wherein the links comprise optical wavelengths.

6. The communication system of claim 1 wherein the first communication device and the second communication device comprise Internet routers.

7. The communication system of claim 1 wherein the first communication device and the second communication device comprise tier one Internet routers.

8. The communication system of claim 1 further comprising a third communication device and a fourth communication device, wherein the first communication device and the third communication device form a first mated pair of Internet routers, and the second communication device and the fourth communication device form a second mated pair of Internet routers.

9. The communication system of claim 1 wherein the first communication device and the second communication device comprise asynchronous transfer mode systems.

10. The communication system of claim 1 wherein the first communication device and the second communication device comprise multi-protocol label switching systems.

11. The communication system of claim 1 wherein the first communication device and the second communication device comprise asynchronous transfer mode systems.

12. The communication system of claim 1 wherein the first communication device and the second communication device comprise multi-protocol label switching systems.

13. A method of operating a communication system, the method comprising:
providing a first communication device and a second communication device, a first optical switch and a second optical switch, a first link and a second link coupling the first communication device to the first optical switch, a third link and a fourth link coupling the second communication device to the second optical switch, and a fifth link, a sixth link, and a seventh link coupling the first optical switch to the second optical switch, wherein under normal operation, the first optical switch connects the first link to the fifth link and connects the second link to the sixth link and the second optical switch connects the third link to the fifth link and connects the fourth link to the sixth link; and
in response to a fault on the fifth link and the sixth link, in the first optical switch, automatically disconnecting the first link from the fifth link and connecting the first link to the seventh link, and in the second optical switch, automatically disconnecting the third link from the fifth link and connecting the third link to the seventh link, and after the seventh link is connected to the first link and the third link, in the first communication device, automatically re-routing traffic from the second link to the first link, and in the second communication device, automatically re-routing traffic from the fourth link to the third link, wherein the disconnections and the connections provided by the first optical switch and the second optical switch comprise Open Systems Interconnect (OSI) layer 1 restoration and the re-routing provided by the first communication device and the second communication device comprises OSI layer 2/3 restoration.

14. The method of claim 13 wherein the first communication device and the second communication device provide the OSI layer 2/3 restoration in response to a timer time-out after the fault, and further comprising setting the timer based on a time period that allows the OSI layer 1 restoration to complete.

15. The method of claim 14 wherein the time period comprises a detection time period to detect the fault, a switch time period to determine a new route and perform switching to the new route, and a restoration time period for traffic to propagate over the new route.

16. The method of claim 14 wherein the timer comprises a carrier delay timer and is set at greater than 100 milliseconds.

17. The method of claim 13 wherein the links comprise optical wavelengths.

18. The method of claim 13 wherein the first communication device and the second communication device comprise Internet routers.

19. The method of claim 13 wherein the first communication device and the second communication device comprise tier one Internet routers.

20. The method of claim 13 further comprising a third communication device and a fourth communication device, wherein the first communication device and the third communication device form a first mated pair of Internet routers, and the second communication device and the fourth communication device form a second mated pair of Internet routers.

* * * * *